US012103314B2

(12) United States Patent
Kitayama

(10) Patent No.: US 12,103,314 B2
(45) Date of Patent: Oct. 1, 2024

(54) INKJET RECORDING APPARATUS

(71) Applicant: CANON KABUSHIKI KAISHA, Tokyo (JP)

(72) Inventor: Yasuaki Kitayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 17/738,967

(22) Filed: May 6, 2022

(65) Prior Publication Data

US 2022/0363061 A1 Nov. 17, 2022

(30) Foreign Application Priority Data

May 13, 2021 (JP) ................................ 2021-081675
Feb. 22, 2022 (JP) ................................ 2022-025538

(51) Int. Cl.
*B41J 2/175* (2006.01)
*B41J 2/165* (2006.01)

(52) U.S. Cl.
CPC ....... *B41J 2/17553* (2013.01); *B41J 2/17503* (2013.01); *B41J 2/1752* (2013.01); *B41J 2/16505* (2013.01); *B41J 2/1753* (2013.01); *B41J 2/17536* (2013.01)

(58) Field of Classification Search
CPC .. B41J 2/17553; B41J 2/17503; B41J 2/1752; B41J 2/16505; B41J 2/1753; B41J 2/17536
See application file for complete search history.

(56) References Cited

U.S. PATENT DOCUMENTS 7,452,066 B2 * 11/2008 Tsuji ..................... B41J 2/1752 347/108

FOREIGN PATENT DOCUMENTS

JP 2016-221696 A 12/2016

* cited by examiner

*Primary Examiner* — Geoffrey S Mruk
(74) *Attorney, Agent, or Firm* — Canon U.S.A., Inc. IP Division

(57) ABSTRACT

An inkjet recording apparatus includes a carriage configured to scan in a scanning direction, and a discharge head mounted on the carriage and configured to discharge liquid. The discharge head includes a housing and a cover that covers the housing, and a space is provided between an end portion of the cover and an end portion of the housing in the scanning direction. The cover is movable relative to the housing in the scanning direction.

24 Claims, 12 Drawing Sheets

-A
180
130
200
DT D7
DT E7
140
172
171
160
200
144
134
135
145
DT D7
DT E7

INKJET RECORDING APPARATUS

BACKGROUND

Field of the Disclosure

The present disclosure relates to an inkjet recording apparatus.

Description of the Related Art

Inkjet recording apparatuses each include a discharge head including an element substrate equipped with an energy generation element that generates energy for discharging liquid, and a housing. One widely known type of discharge head is a discharge head that moves by being mounted on a carriage provided to the inkjet recording apparatus. Such a type of discharge head carries out recording by discharging ink while moving in a scanning direction together with the carriage due to the carriage caused to scan in the scanning direction.

The housing of the discharge head mounted on the carriage includes an electronic component such as an ink containing portion and an electric contact therein. The housing of the discharge head may be covered with a cover to shield such a portion from, for example, a user's touch or contamination with the ink or the like. Japanese Patent Application Laid-Open No. 2016-221696 discusses a configuration in which a cover is attached to a housing by providing a recessed portion (an opening) to the housing of a discharge head and inserting and fitting a claw of the cover into the recessed portion.

Ink mist is generated around the discharge head when an image is recorded by discharging the ink from the discharge head. The study of the present inventors has revealed that, if the carriage and the discharge head scan with the mist floating around there, the mist may intrude to the inside of the housing, even when the cover is attached to the housing, and contaminate the inside of the housing. Such contamination of the inside of the housing due to the mist may affect the function of the discharge head. For example, in a case where an electronic component is disposed inside the housing, the contamination may even cause the electronic component to stop functioning normally.

SUMMARY

Aspects of the present disclosure provide an inkjet recording apparatus that makes it difficult for mist to intrude into the inside of a housing of a discharge head even when ink is discharged while the discharge head mounted on a carriage is caused to scan.

According to an aspect of the present disclosure, an inkjet recording apparatus includes a carriage configured to scan in a scanning direction, and a discharge head mounted on the carriage and configured to discharge liquid, wherein the discharge head includes a housing and a cover that covers the housing, wherein a space is provided between an end portion of the cover and an end portion of the housing in the scanning direction, and wherein the cover is movable relative to the housing in the scanning direction.

Further features of the present disclosure will become apparent from the following description of exemplary embodiments with reference to the attached drawings.

DESCRIPTION OF THE EMBODIMENTS

Figure 1:
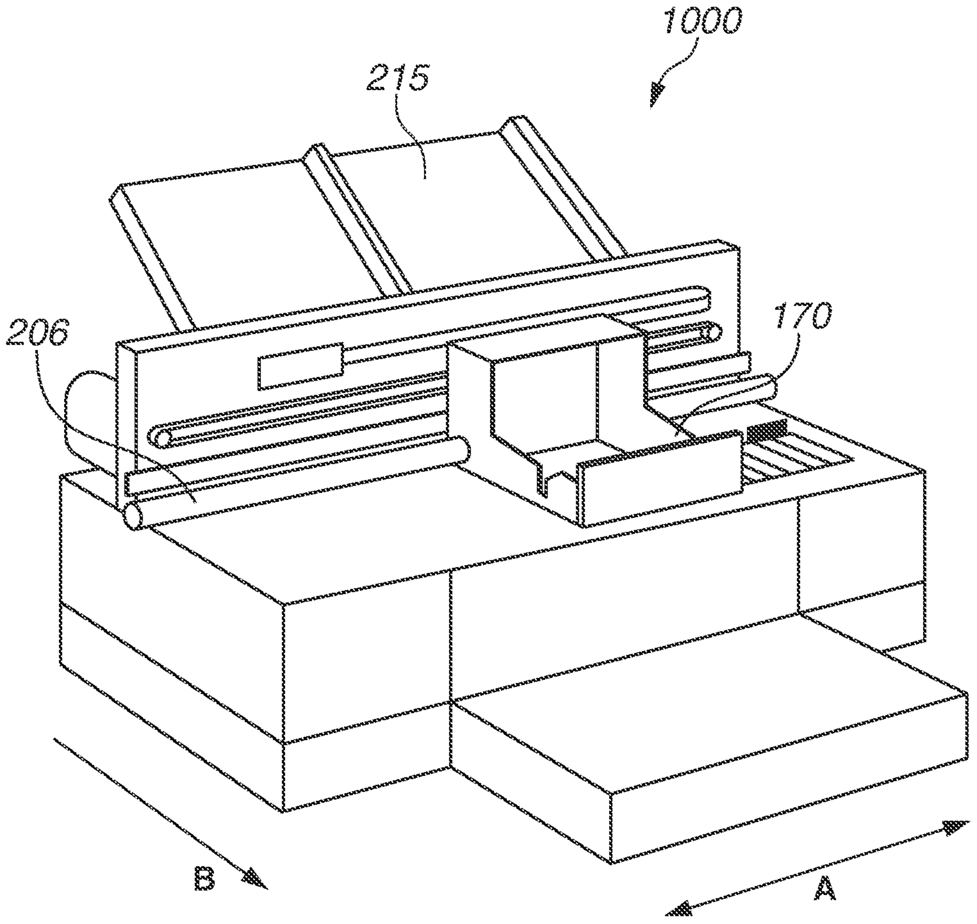
FIG. 1 illustrates an inkjet recording apparatus.

An inkjet recording apparatus according to an exemplary embodiment of the present disclosure will be described. FIG. 1 illustrates a perspective view of an inkjet recording apparatus 1000 according to the present exemplary embodiment. The inkjet recording apparatus 1000 includes a carriage 170, which reciprocally scans in a scanning direction (an A direction) along a guide shaft 206. A discharge head that discharges liquid (not illustrated in FIG. 1) is mounted on the carriage 170. In the inkjet recording apparatus 1000, a recording medium is placed on a tray 215 or the like provided to the inkjet recording apparatus 1000. The recording medium is conveyed while passing through the inside of the inkjet recording apparatus 1000 from the tray 215 or the like in a conveyance direction (a B direction). Then, the carriage 170 and the discharge head move relative to the conveyed recording medium in the scanning direction (the A direction) perpendicular to the conveyance direction, and the discharge head discharges the ink onto the recording medium in conjunction with this movement. An image is recorded by such an operation. The inkjet recording apparatus 1000 is provided with, for example, an ink cartridge mounted thereon or an ink containing unit capable of replenishing the ink although the illustration thereof is omitted herein, thereby having a mechanism that supplies the ink from them to the discharge head.

Figure 2B:
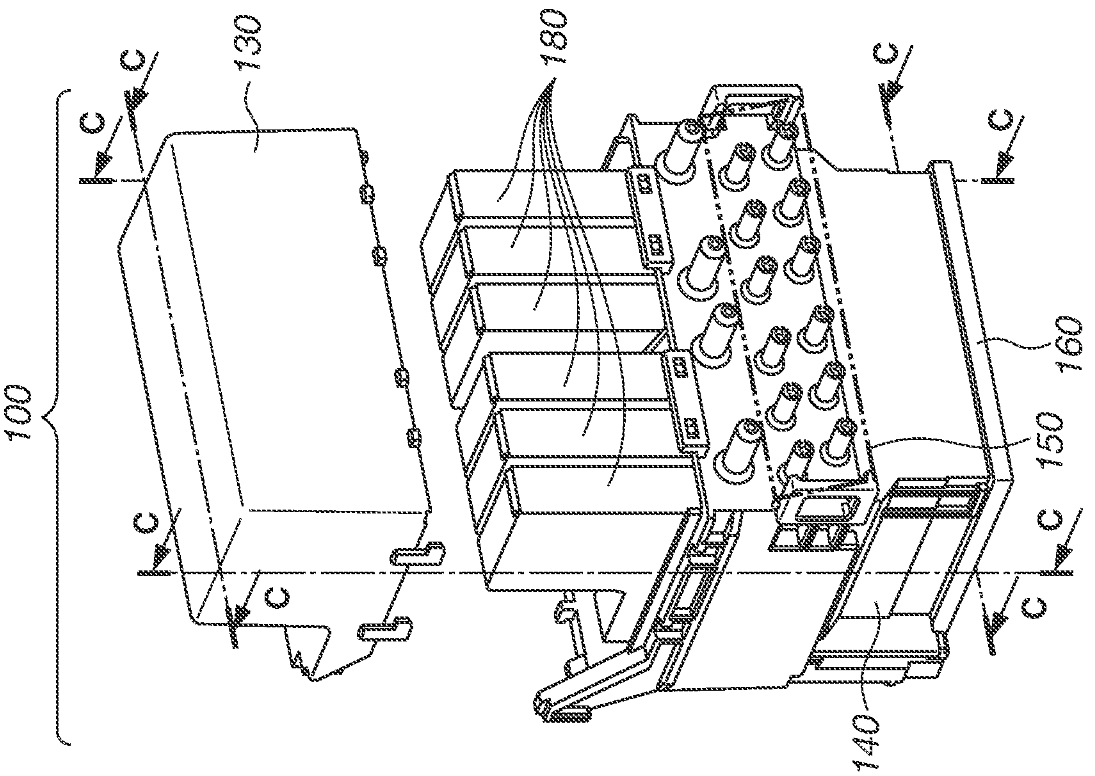
FIGS. 2A and 2B each illustrate a discharge head.
Figure 2A:
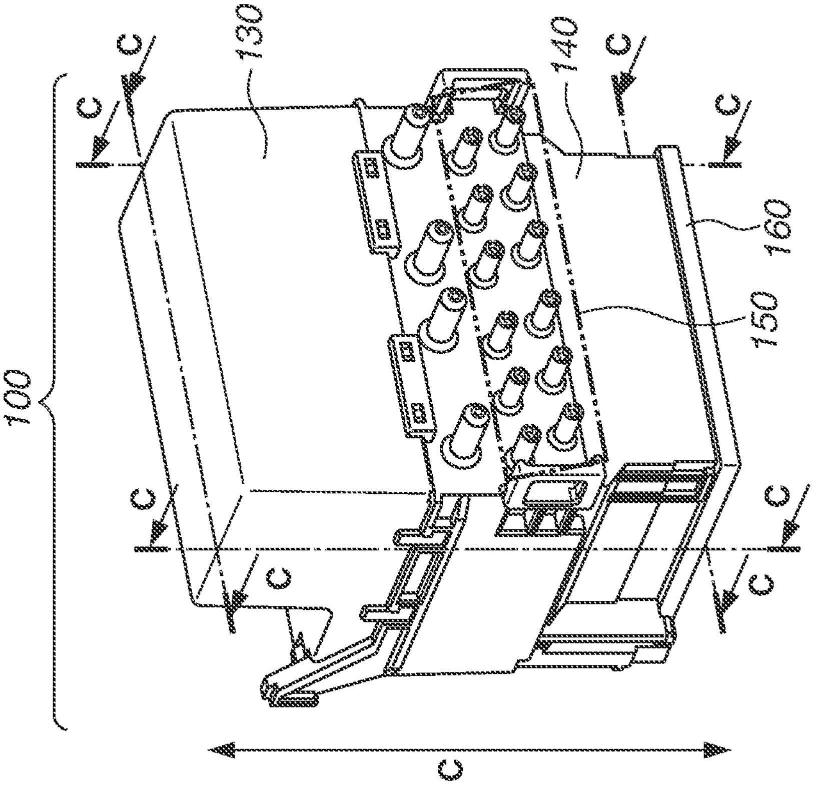

FIGS. 2A and 2B each illustrate a perspective view of a discharge head 100 mounted on the above-described carriage 170 and configured to discharge the liquid. The discharge head 100 includes a cover 130 and a housing 140. FIG. 2A illustrates the discharge head 100 with the cover 130 attached to the housing 140, and FIG. 2B illustrates the discharge head 100 with the cover 130 detached from the housing 140. The housing 140 is molded from, for example, resin, and includes a discharge unit 160 on a lower side in a direction of a gravitational force (a C direction). The discharge unit 160 includes a discharge substrate equipped with an element that generates energy for discharging the liquid (a heat generation resistor or a piezoelectric element), and a discharge port from which the liquid is discharged. The liquid is discharged from the discharge port of the discharge unit 160 downward along the direction of the gravitational force. The cover 130 is attached on an upper side of the housing 140 in the direction of the gravitational force.

The discharge head 100 illustrated in FIGS. 2A and 2B includes a circulation unit 180 inside the housing 140. The circulation unit 180 partially protrudes from the housing 140, and is covered with the cover 130. The circulation unit 180 is surrounded by the housing 140 and the cover 130. Desirably, the circulation unit 180 is a negative-pressure control member that controls a negative pressure in a flow path in the discharge head 100. The liquid is delivered from the ink cartridge or the ink containing unit provided to the inkjet recording apparatus 1000 to the circulation unit 180 via a supply port 150. The circulation unit 180 controls the pressure of this delivered liquid. In the discharge head 100, a flow path through which the liquid can be circulated is formed among the circulation unit 180, the housing 140, and the discharge unit 160. The circulation unit 180 generates a pressure difference between inbound and outbound flow paths by pressure control, and the liquid is circulated due to this pressure difference. In FIGS. 2A and 2B, for one housing 140, six circulation units 180 are provided therein.

Figure 3B:
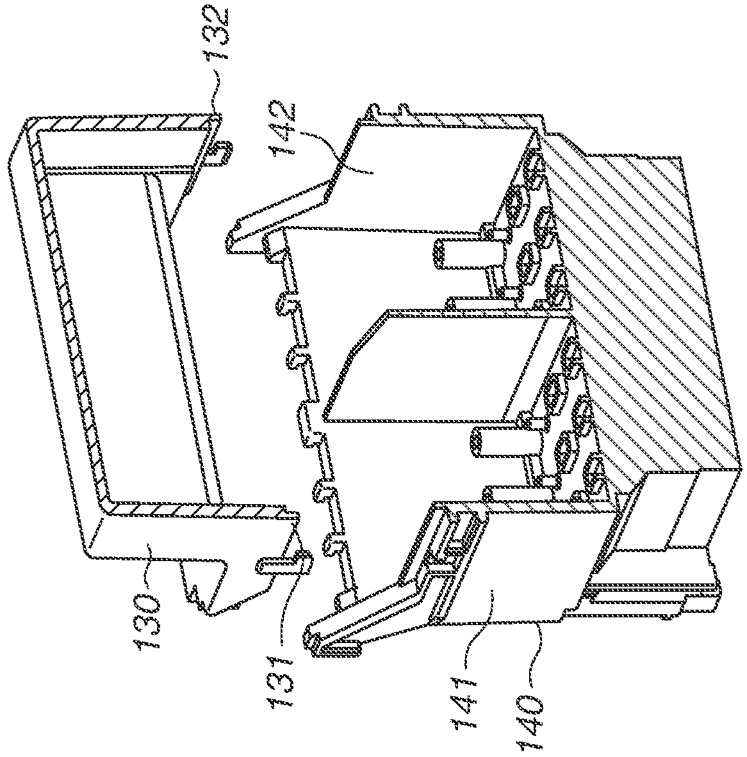
FIGS. 3A and 3B each illustrate a cross-section of the discharge head.
Figure 3A:
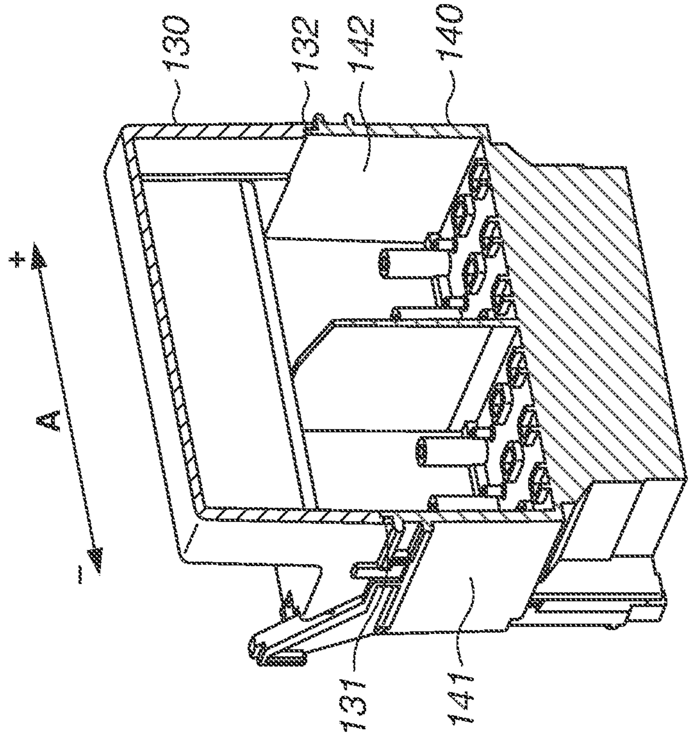

FIGS. 3A and 3B each illustrate a C cross-section in FIGS. 2A and 2B (a cross-section in a plane surrounded by four C-C lines). FIGS. 3A and 3B correspond to FIGS. 2A and 2B, respectively. The discharge unit 160 and the circulation unit 180 are omitted in FIGS. 3A and 3B for illustrative purposes. The housing 140 includes walls 141 and 142. Further, the cover 130 includes walls 131 and 132.

Figure 4B:
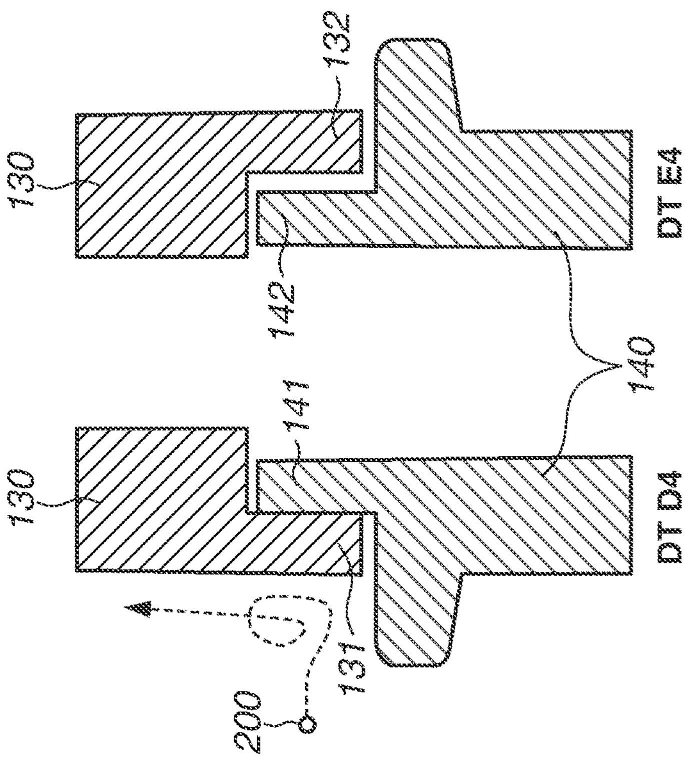
FIGS. 4A and 4B each illustrate a cross-section of the discharge head.
Figure 4A:
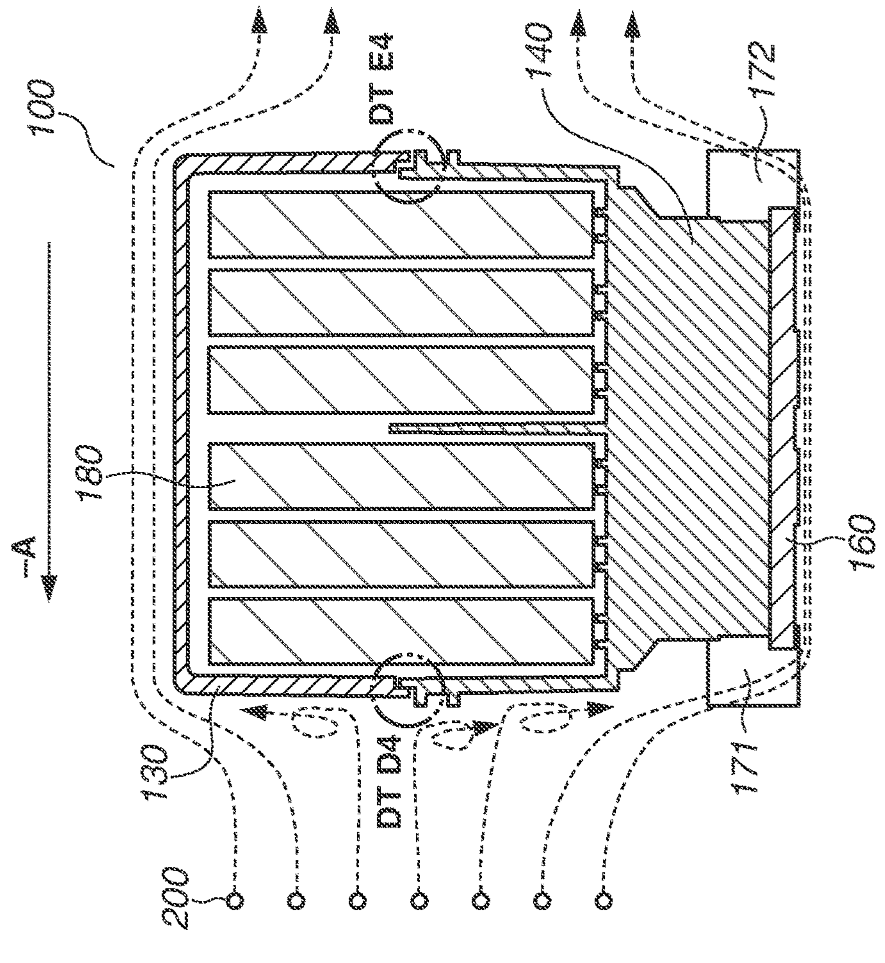

FIGS. 4A and 4B each illustrate a view of the discharge head 100 when the carriage 170 scans in the scanning direction. FIG. 4A illustrates a view of the C cross-section when the carriage 170 and the discharge head 100 are moving in a −A direction (a direction from the right to the left in the case of FIG. 1). Liquid that has not landed on the recording medium in the liquid discharged from the discharge head 100 is transformed into mist 200 and drifts in the air in and around a region where the discharge head 100 moves. When the carriage 170 and the discharge head 100 scan and move in this region, the mist 200 attempts to intrude into the inside of the discharge head 100 as illustrated in FIG. 4A. As a countermeasure against it, the intrusion of the mist 200 into the discharge head 100 is prevented or reduced by attaching the cover 130 movably relative to the housing 140 in the scanning direction when the carriage 170 scans in the scanning direction. Attaching the cover 130 in this manner can prevent or reduce the intrusion of the mist 200 into the discharge head 100. This will be described in detail below.

The walls 131, 141, 142, and 132 are arranged so as to overlap in the A direction with the cover 130 attached as illustrated in FIGS. 4A and 4B. Further, the cover 130 is attached in such a manner that the walls 131 and 132 of the cover 130 are located outside the walls 141 and 142 of the housing 140 on any of the −A side and the +A side. When the discharge head 100 is mounted on the carriage 170, the discharge portion and the vicinity thereof should be securely fixed to prevent the orientation from changing even during the reciprocating scanning to achieve accurate printing. Thus, the discharge head 100 is fixed to the carriage 170 with the discharge unit 160 and the housing 140 positioned using holding units 171 and 172.

A scanning speed of the carriage 170 and the discharge head 100 in the scanning direction is approximately 1.0 to 2.0 m/second, a movement distance is approximately 1.0 to 2.0 m, and an acceleration/deceleration speed is approximately 8 to 15 $m/s^2$. Because the carriage 170 and the discharge head 100 are moved toward the mist 200 floating around in the apparatus 1000 under such conditions, the mist 200 may intrude into the inside via a recessed portion of the housing 140 of the discharge head 100. Especially, for example, in a case where acid ink is used as the discharged liquid, the intrusion of the mist 200 may further likely cause oxidation of a metallic component and corrosion of an electric component inside the discharge head 100. Such corrosion may even contribute to making the control of the circulation impossible, because an electric contact, a pump for circulating the liquid, and a control board are mounted on the circulation unit 180 in the present exemplary embodiment.

Figures 7A, 7B:
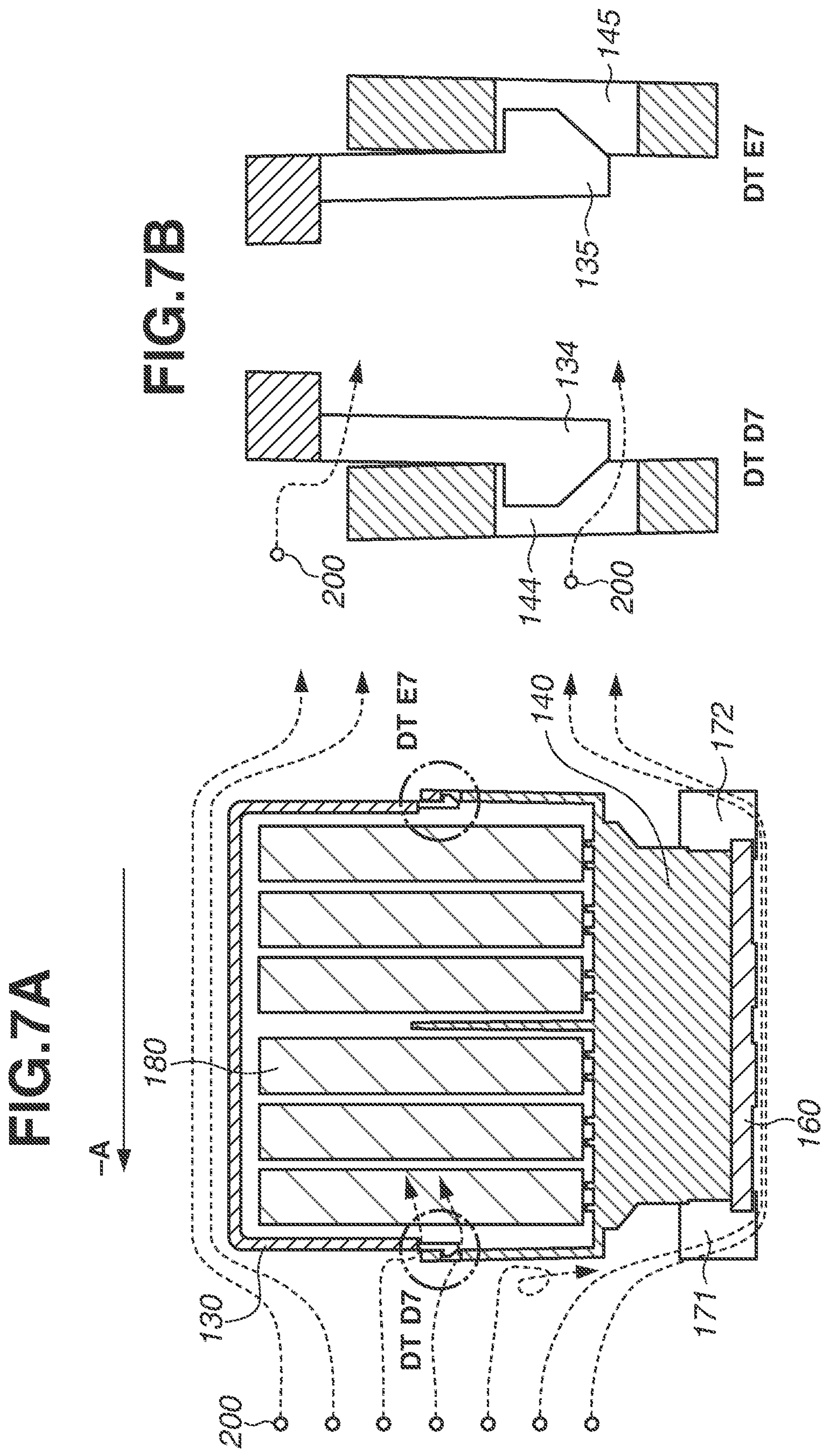
FIGS. 7A and 7B each illustrate a cross-section of the discharge head.

The housing 140 of the discharge head 100 may be provided with, for example, a recessed portion in which a claw of the cover 130 is inserted. Such a recessed portion serves as a route that permits the intrusion of the mist 200. If the discharge head 100 is designed in such a manner that the claw of the cover 130 is tightly fitted in the recessed portion and is configured in such a manner that the recessed portion is entirely filled with the claw, any misalignment becomes unallowable in the positioning between the recessed portion and the claw, and thus such a design is significantly difficult. For this reason, the claw is fitted in the recessed portion with some margin added to the recessed portion and then the cover 130 is securely fixed after that, and therefore a space is inevitably generated inside the recessed portion. FIGS. 7A and 7B each illustrate a schematic view of a method that attaches the cover 130 to the housing 140 by providing an opening 144 to the housing 140 and inserting a claw 134 of the cover 130 from inside the housing 140. FIG. 7B is an enlarged view of a portion where the cover 130 and the housing 140 face each other in FIG. 7A. The mist 200 floats around the discharge head 100, and the discharge head 100 is moved toward it. This undesirably leads to intrusion of the mist 200 into the discharge head 100 via a space of the opening 144 provided to the housing 140 as illustrated in FIGS. 7A and 7B.

In a case where the recessed portion is not provided to the housing 140 of the discharge head 100 and the cover 130 is placed to partially overlap the housing 140 as illustrated in FIGS. 4A and 4B, a space (a recessed portion) is also generated between them. An attempt to eliminate such a space ends up making it difficult to attach the cover 130 to the housing 140. In light thereof, normally, a margin is added thereto by reducing a width of the housing 140 (the width in the A direction in this case) compared to a width of an opening on the inner side of the cover 130 (the width in the A direction in this case). Then, the discharge head 100 is configured in such a manner that the cover 130 is fixed unmovably relative to the housing 140 after being attached to the housing 140. Even in this case, an opening serving as a route that permits the intrusion of the mist 200 is formed between the cover 130 and the housing 140.

Figure 5A:
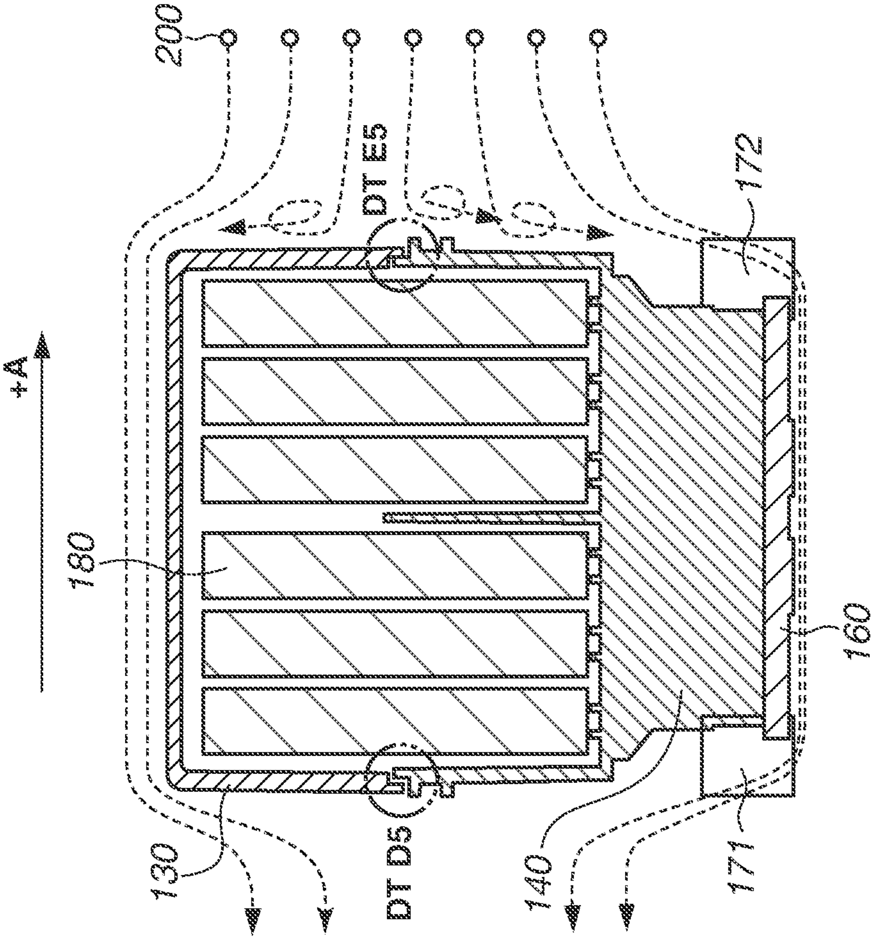
FIGS. 5A and 5B each illustrate a cross-section of the discharge head.
Figure 5B:
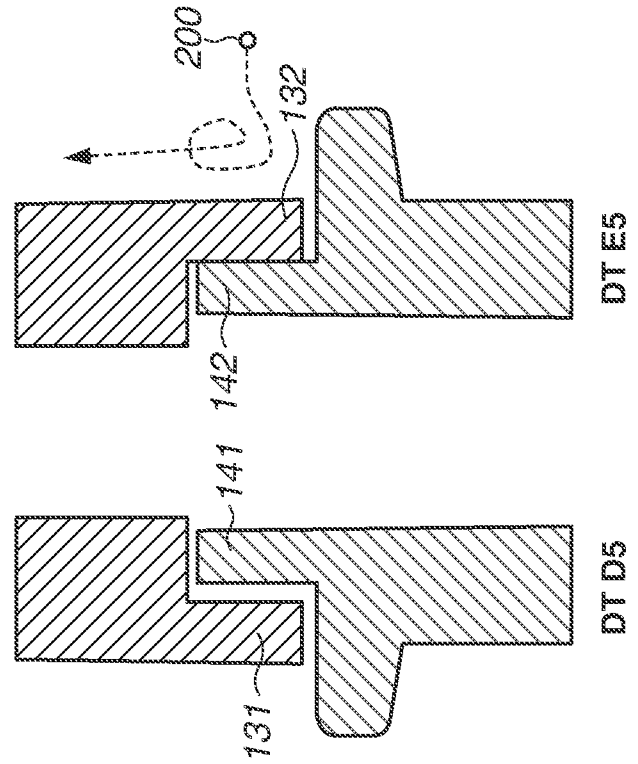

As a countermeasure against it, the intrusion of the mist 200 into the housing 140 can be prevented or reduced by attaching the cover 130 movably relative to the housing 140 in the scanning direction when the carriage 170 scans in the scanning direction. FIG. 4A illustrates how the carriage 170 and the discharge head 100 are moving in the −A direction in the C cross-section of the discharge head 100 (see FIGS. 2A and 2B). Similarly, FIG. 5A illustrates how the carriage 170 and the discharge head 100 are moving in the +A direction in the C cross-section of the discharge head 100. FIG. 4B is an enlarged view of a portion where the cover 130 and the housing 140 face each other in FIG. 4A, and, similarly, FIG. 5B is an enlarged view of a portion where the cover 130 and the housing 140 face each other in FIG. 5A. As seen from FIGS. 4B and 5B, a space having a width changing according to the movement of the cover 130 in the scanning direction is provided between an end portion (each of the both ends) of the cover 130 and an end portion (each of the both ends) of the housing 140 in the scanning direction.

First, the space (the recessed portion) reduces on a front side in a travelling direction of the carriage 170 at the time of the scanning (the movement) in the −A direction illustrated in FIGS. 4A and 4B. The cover 130 and the housing 140 are in abutment with each other on the front side in the travelling direction, and the space is closed on the front side in the travelling direction. Conversely, the space increases and remains on a back side in the travelling direction. At the time of the scanning in the +A direction illustrated in FIGS. 5A and 5B also, the width of the space reduces on the front side in the travelling direction, while the cover 130 and the housing 140 are in abutment with each other and the space is closed on the front side. Conversely, the space increases on the back side. This is because the cover 130 is left behind the moving carriage 170 and housing 140 of the discharge head 100 under an inertial force, and, in addition thereto, a side surface of the cover 130 on a discharge head travelling direction side receives a pressure generated due to the movement of the discharge head 100. As a result of the study conducted by the present inventors, it has been revealed that the mist more easily intrudes into the housing from the front side of the housing of the discharge head when the carriage scans. It has been revealed that, especially, if a space (a recessed portion) exists on the front side in a movement direction of the housing of the discharge head, a positive pressure is generated in the travelling direction of the discharge head due to the movement of the discharge head, and this facilitates the intrusion of the mist via the recessed portion on the front side. On the other hand, it has also been revealed that, even if a space (a recessed portion) exists on the back side in the movement direction of the housing of the discharge head, the mist less likely intrudes into the housing via this space. Accordingly, even in the case where a space (a recessed portion) exists on the housing 140 or between the cover 130 and the housing 140, the intrusion of the mist 200 from the front side of the discharge head 100 can be prevented or reduced by attaching the cover 130 movably in the scanning direction.

Figure 6B:
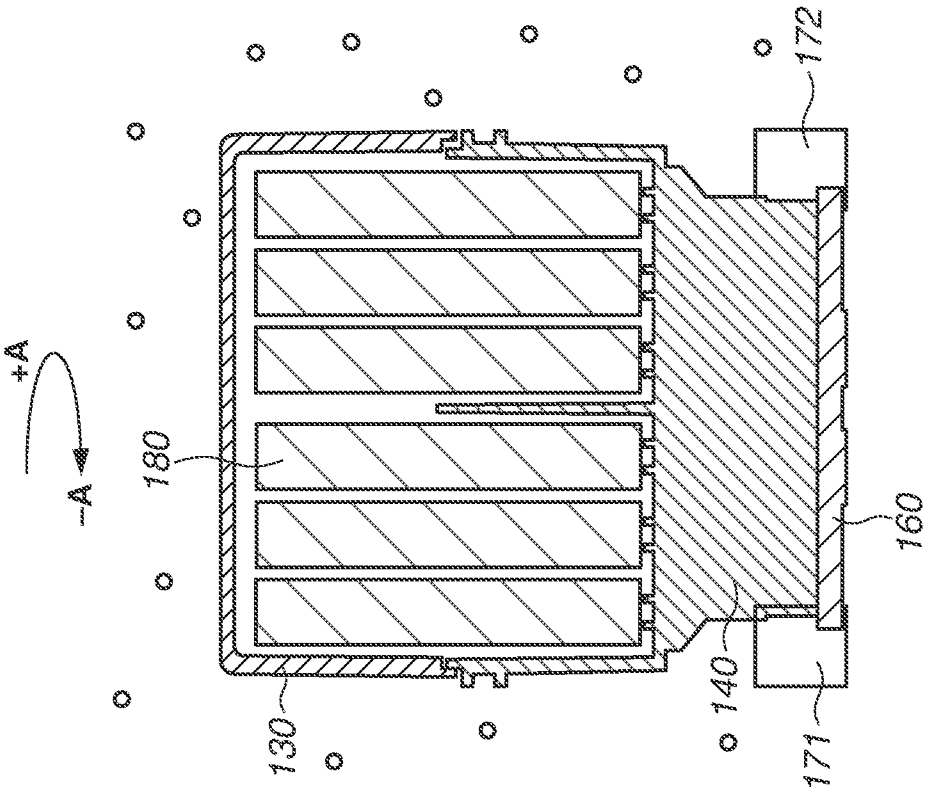
FIGS. 6A and 6B each illustrate a cross-section of the discharge head.
Figure 6A:
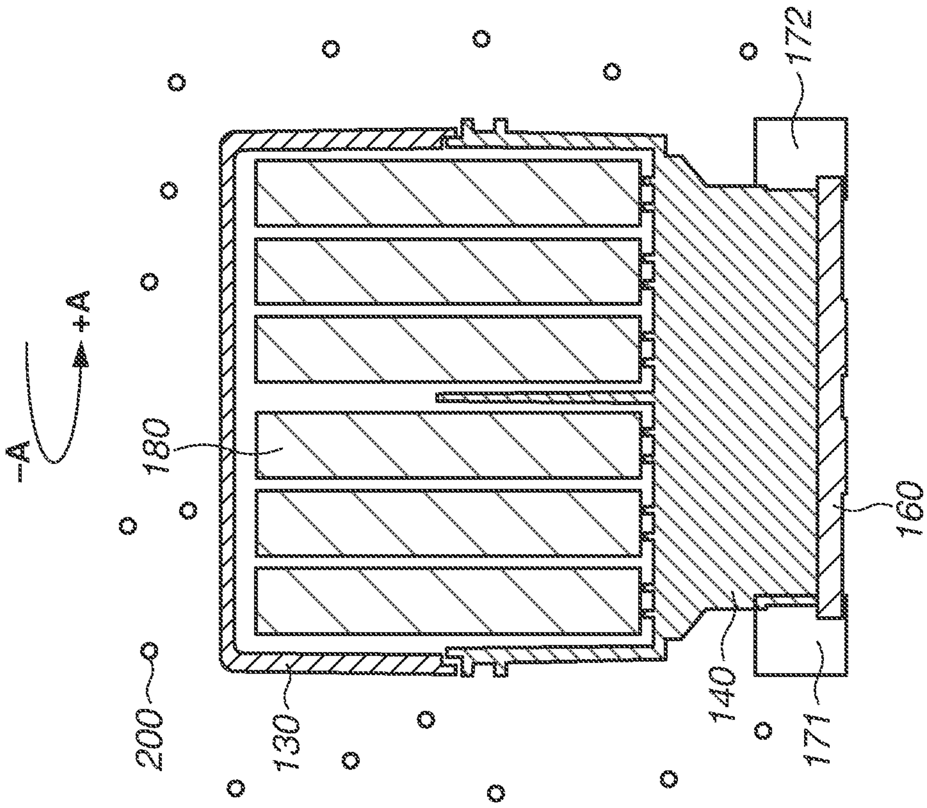

FIGS. 6A and 6B each illustrate the C cross-section when the discharge head 100 switches the direction during the reciprocating scanning. FIG. 6A illustrates how the discharge head 100 switches the direction from the −A direction to the +A direction, and FIG. 6B illustrates how the discharge head 100 switches the direction from the +A direction to the −A direction. When the direction is switched, the cover 130 moves in the travelling direction before the stop due to the inertial force, and closes the space in the next travelling direction. This means that the cover 130 blocks the intrusion route of the mist 200 after the direction is switched at the moment of the stop, and thus the intrusion of the mist 200 can be prevented or reduced.

Figure 8:
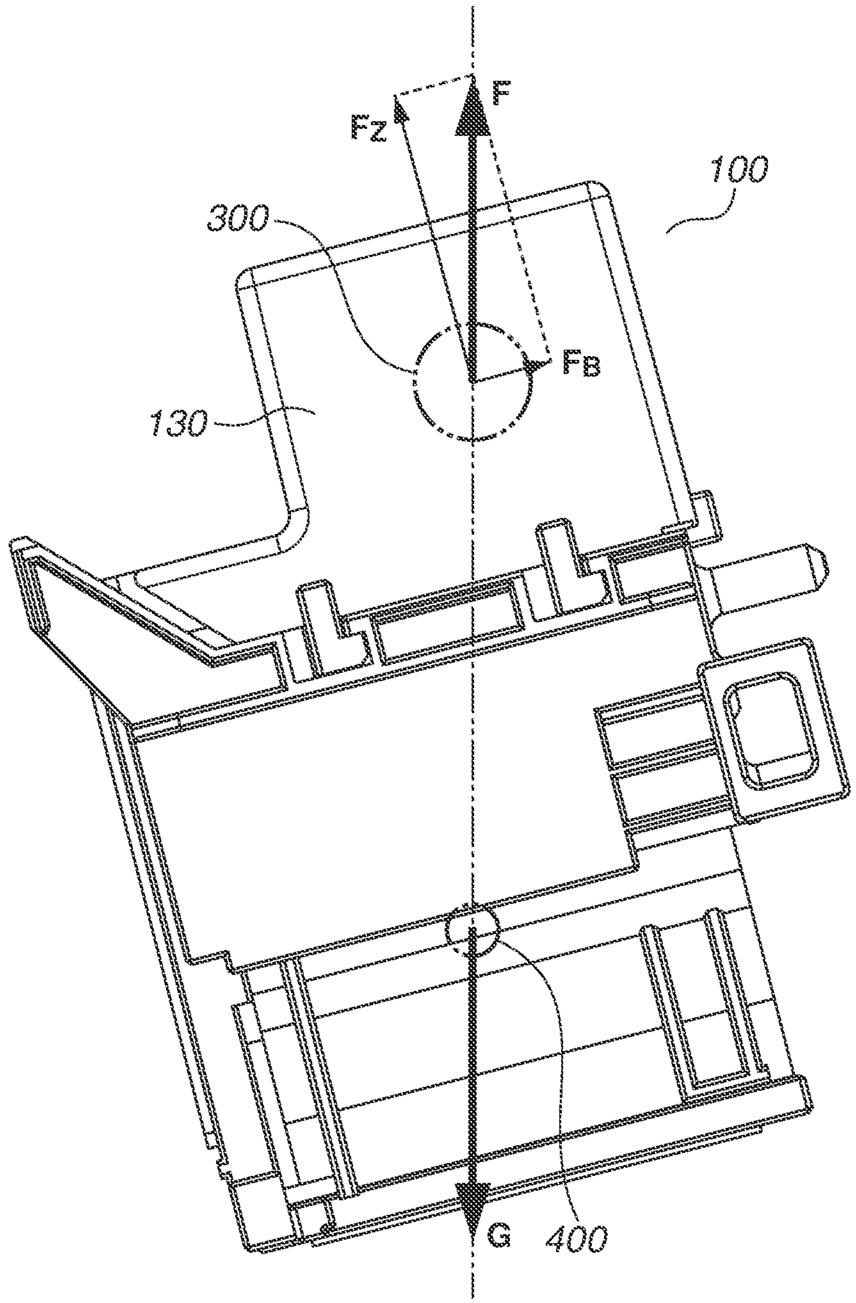
FIG. 8 illustrates how the discharge head is lifted up.
Figures 9A, 9B, 9C, 9D:
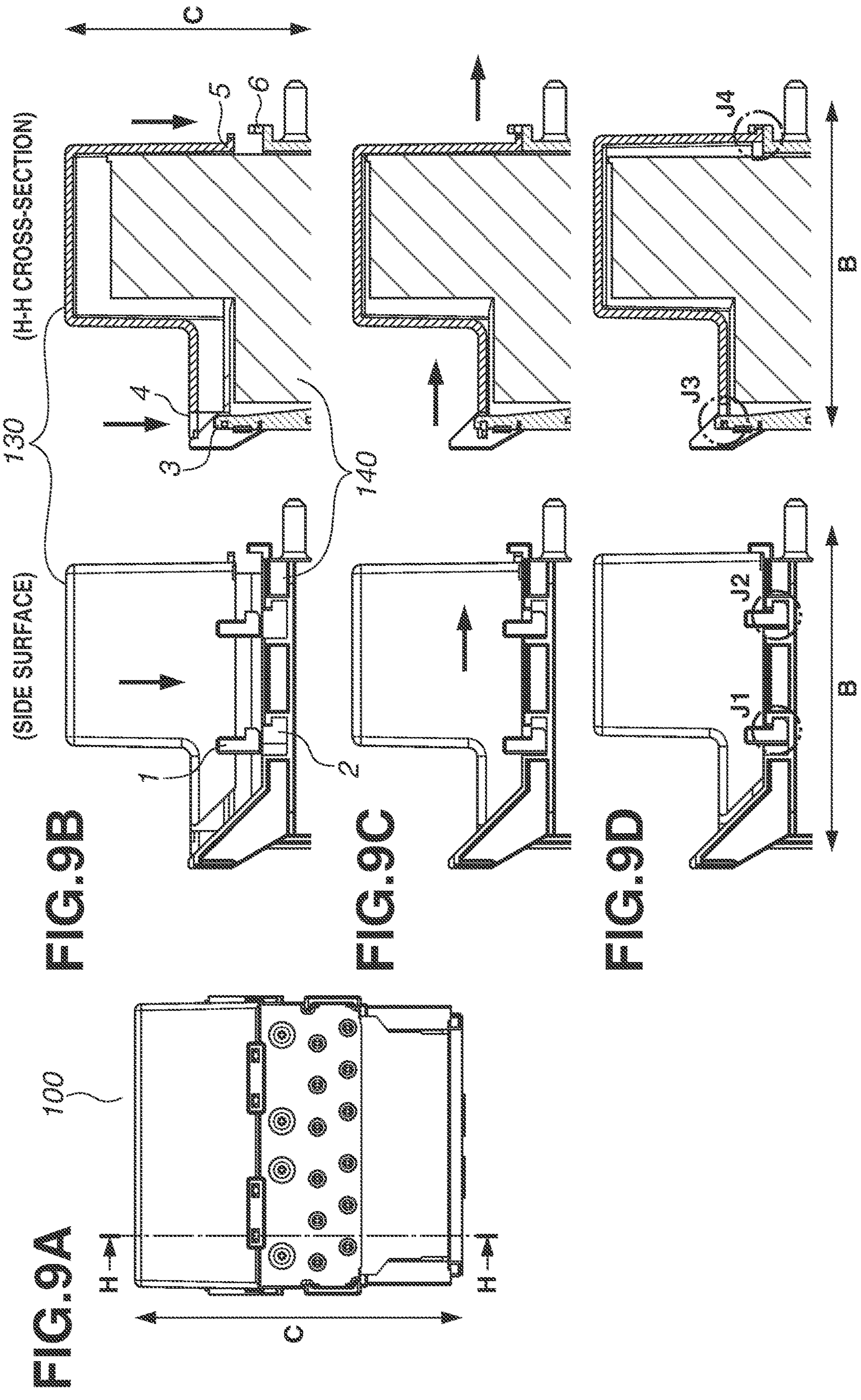
FIGS. 9A, 9B, 9C and 9D illustrate how a cover is attached to a housing of the discharge head.

FIG. 8 illustrates the discharge head 100 in a state of being held by a user. When the discharge head 100 is removed on the carriage 170, it is expected that the user holds the side surfaces of the cover 130 at the both ends in the A direction (FIG. 8 illustrates only the side surface on one side). At this time, assuming that a holding portion 300 refers to a portion of the side surface that the user holds, the discharge head 100 is placed in such an orientation that the holding portion 300 and a center of gravity 400 of the discharge head 100 are aligned in the direction of the gravitational force. An alphabetic character G in FIG. 8 schematically indicates the gravitational force when the discharge head 100 is held. Assuming that F represents a force of holding and lifting up the discharge head 100, the force F can be divided into a component force $F_Z$ upward in the direction of the gravitational force in the state that the discharge head 100 is mounted on the inkjet recording apparatus 1000 and a component force $F_B$ in the conveyance direction of the recording medium (the direction B). Desirably, the cover 130 is attached by an attachment method that prevents the cover 130 and the housing 140 from being easily separated from each other due to these forces $F_Z$ and $F_B$. Such an attachment method will be described with reference to FIGS. 9A to 9D. FIG. 9A illustrates a back surface (the surface mainly visible in FIG. 2) of the discharge head 100. FIGS. 9B to 9D illustrate a flow when the cover 130 is attached to the housing 140. The diagrams on the left sides of FIGS. 9B to 9D each illustrate a side-surface side of the housing 140, and the diagrams on the right sides of FIGS. 9B to 9D each illustrate a cross-section along a line H-H in FIG. 9A. FIG. 9B illustrates a movement of the cover 130 downward in the direction of the gravitational force (the C direction), FIG. 9C illustrates a movement of the cover 130 in the B direction, and FIG. 9D illustrates a state where the attachment of the cover 130 to the housing 140 is completed. An L-shaped claw 1 is provided on a side surface of the end portion of the cover 130 in the scanning direction. The L-shaped claw 1 is shaped to extend in the direction of the gravitational force, and be further bent by 90 degrees to extend in the direction B. Then, an L-shaped groove 2 corresponding to the claw 1 is provided on the wall 141 (142) of the end portion of the housing 140 in the scanning direction. The discharge head 100 is shaped in such a manner that the cover 130 and the housing 140 are not easily separated from each other in the direction of the gravitational force even when receiving the component forces $F_Z$ and $F_B$ illustrated in FIG. 8 by temporarily elastically deforming the claw 1 and fitting it into the groove 2. More specifically, the claw 1 and the groove 2 are fitted at each of portions J1 and J2 in FIG. 9D. Providing the claw 1 of the cover 130 and the groove 2 of the housing 140 on the exterior (outer) portion of each component in this manner eliminates the necessity of providing an opening that establishes communication between inside and outside the housing 140, thereby making the formation of the mold easy and facilitating the molding.

Further, as illustrated in the cross-section along the line H-H in FIG. 9D, portions J3 and J4, which are fitted by sliding the cover 130 in the C direction and the B direction, are also provided at the end portions (the both ends in this case) of the cover 130 and the housing 140 in the B direction. A claw 3 of the housing 140 and a groove 4 of the cover 130 are fitted to each other at the portion J3, and a claw 5 of the cover 130 and a groove 6 of the housing 140 are fitted to each other at the portion J4. This configuration also contributes to achieving the shape that prevents the cover 130 and the housing 140 from being easily separated even when receiving the component forces $F_Z$ and $F_B$ illustrated in FIG. 8. The claws and the grooves can be provided to the opposite members, respectively. The discharge head 100 in the present example is assumed to be 400 g or heavier and 600 g or lighter and is configured in the above-described manner to establish the robust attachment, but not all J1 to J4 portions necessarily have to be provided depending on the weight and the holding portion 300. For example, if the configuration is simplified according to the weight, J1 and J2 fixed on the outer side of the housing 140 can be simply shaped as snap-fit.

As described above, the cover 130 is attached movably relative to the housing 140 in the scanning direction (the A direction) when the carriage 170 scans in the scanning direction. Accordingly, for example, in a case where the cover 130 and the housing 140 are fitted at the above-described four portions J1, J2, J3, and J4, the cover 130 is attached with clearances created at all of the four portions. More specifically, the cover 130 is attached with clearances created at least in the A direction, which is the scanning direction, at the fitted portions, and is then set in an unfixed manner at least in the A direction continuously therefrom. Under ordinary circumstances, even when being attached to create some clearance, the cover 130 is fixed unmovably once being attached. However, maintaining the clearances in the A direction continuously and setting the cover 130 in an unfixed manner allows the cover 130 to move relative to the housing 140 in the scanning direction (the A direction) when the carriage 170 scans in the scanning direction. The widths of the clearances or the like will be described below.

Figure 10A:
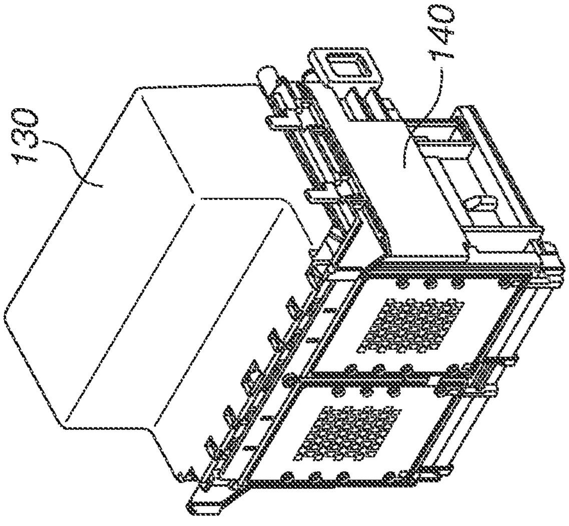
FIGS. 10A, 10B, 10C and 10D illustrate how the cover is attached to the housing of the discharge head.
Figure 10B:
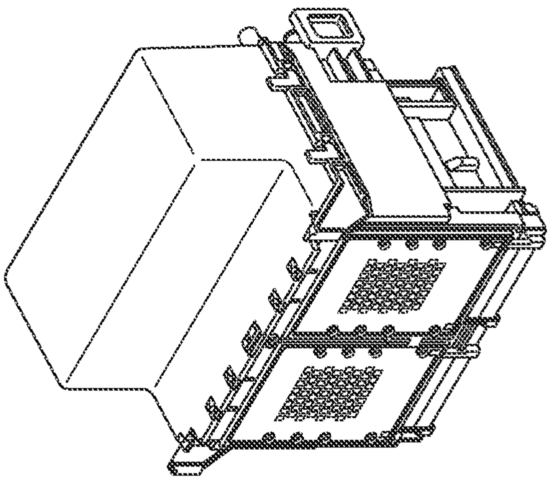
Figure 10C:
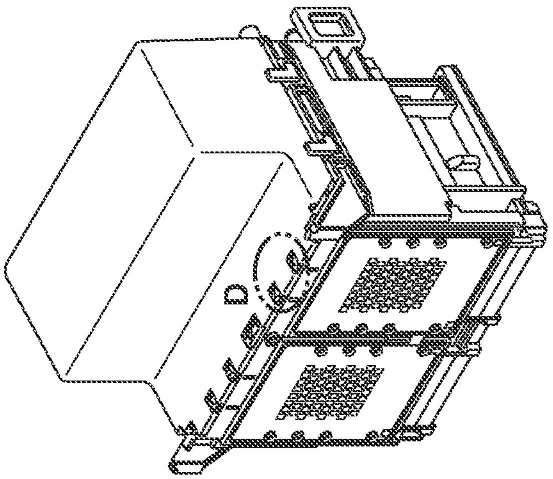
Figure 10D:
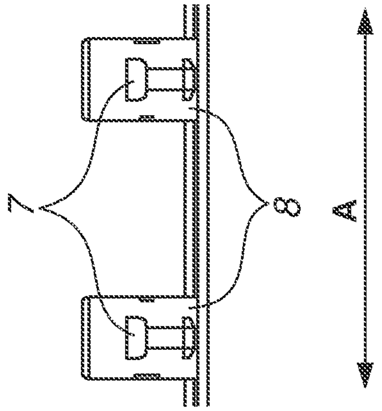

FIGS. 10A to 10D illustrate how the cover 130 is attached to the housing 140. The attachment of the cover 130 proceeds in the order of FIGS. 10A, 10B, and 10C. FIG. 10D illustrates a view of a portion labeled D in FIG. 10C when being viewed from above and enlarged. A claw 7 of the housing 140 is fitted in a groove 8 of the cover 130 in FIG. 10D, and a space is provided in the A direction between the claw 7 and the groove 8. The claw 7 is permitted to move in the groove 8 within a range defined by this space. The cover 130 is placed movably relative to the housing 140 in this manner.

Desirably, the cover 130 and the housing 140 are formed by resin molding. The rein molding brings about a great variation in the shape due to material contraction compared to a processing method such as cutting, and thus the clearances allow the cover 130 to be easily attached by absorbing the variation in the shape. However, the clearances are designed in such a manner that the clearances between the walls 131 and 141 and the walls 132 and 142 have the smallest size among the clearances in the A direction in this case.

The clearances will be described. The amounts of the clearances depend on the sizes of the cover 130 and the housing 140 but are designed assuming that their sizes match a standard dimension, in particular, a width of 30 mm or wider and 120 mm or narrower in the A direction. A width tolerance of each component is ±0.25 mm. Further, too wide a clearance between the cover 130 and the housing 140 may cause a delay in the timing of closing the clearance, thereby undesirably permitting the mist 200 to intrude into the inside of the head 100. Therefore, the clearances between the cover 130 and the housing 140 (the distances by which the walls 131 and 141 and the walls 132 and 142 are maximumly separated from each other, respectively) are determined in consideration of a component tolerance and the closing responsiveness. More specifically, desirably, the distances when the walls 131 and 141 are maximumly separated from each other, and, further, the walls 132 and 142 are maximumly separated from each other are 0.4 mm or longer and 1.0 mm or shorter in the A direction. In other words, the widths between the walls 131 and 141 and the walls 132 and 142 change as these walls are brought into abutment with each other or are separated from each other by up to 0.4 mm or longer and 1.0 mm or shorter depending on the position of the carriage 170. The walls 131 and 141 and the walls 132 and 142 are walls that face each other at the both ends of the cover 130 and the housing 140 in the A direction. Setting the space between the cover 130 and the housing 140 to up to 0.4 mm or wider and 1.0 mm or narrower means designing the discharge head 100 in such a manner that the value of the space on the back side in the travelling direction matches 0.4 mm or wider and 1.0 mm or narrower when this space maximumly increases while the carriage 170 is moved in the scanning direction. For example, desirably, the width of the space is set to 0.2 mm or wider and 0.5 mm or narrower in a case where the cover 130 and the housing 140 are aligned at the centers thereof and spaces are generated at the both ends thereof.

Desirably, clearances at the portions other than the walls 131 and 141 and the walls 132 and 142, such as a clearance between the walls of the claw 7 and the groove 8 in FIG. 10D, are set to a wider clearance than the clearance between the above-described walls. For example, desirably, the discharge head 100 is designed in such a manner that the clearance between the walls of them (for example, between the wall of the claw 7 and the wall of the groove 8) matches up to 1.0 mm or wider and 1.6 mm or narrower at the portions that fix the cover 130 movably at the both ends in the B direction.

Figure 11C:
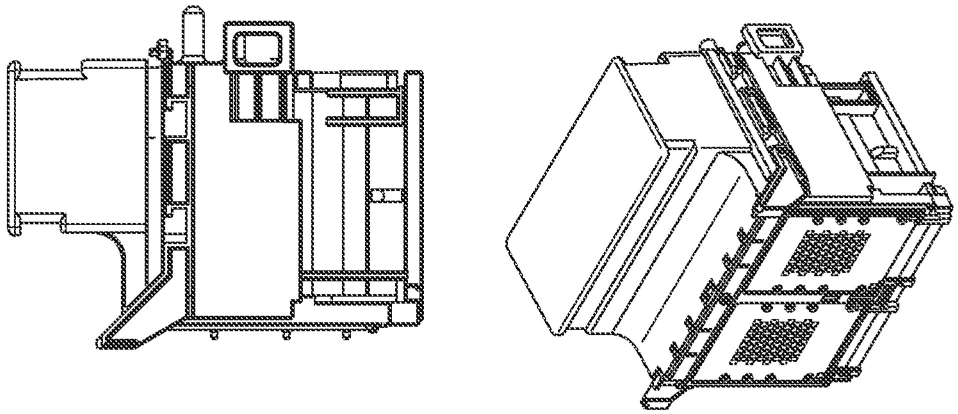
FIGS. 11A, 11B, and 11C illustrate how the cover is attached to the housing of the discharge head.
Figure 11B:
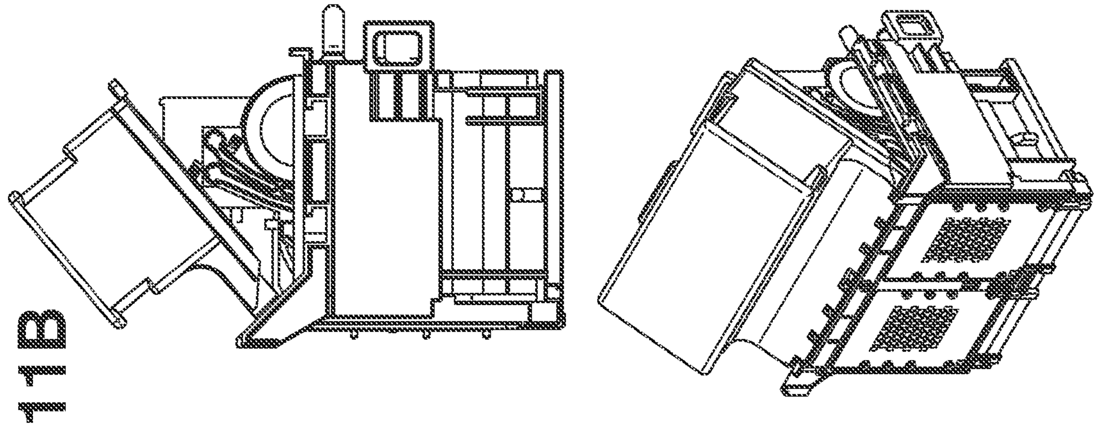
Figure 11A:
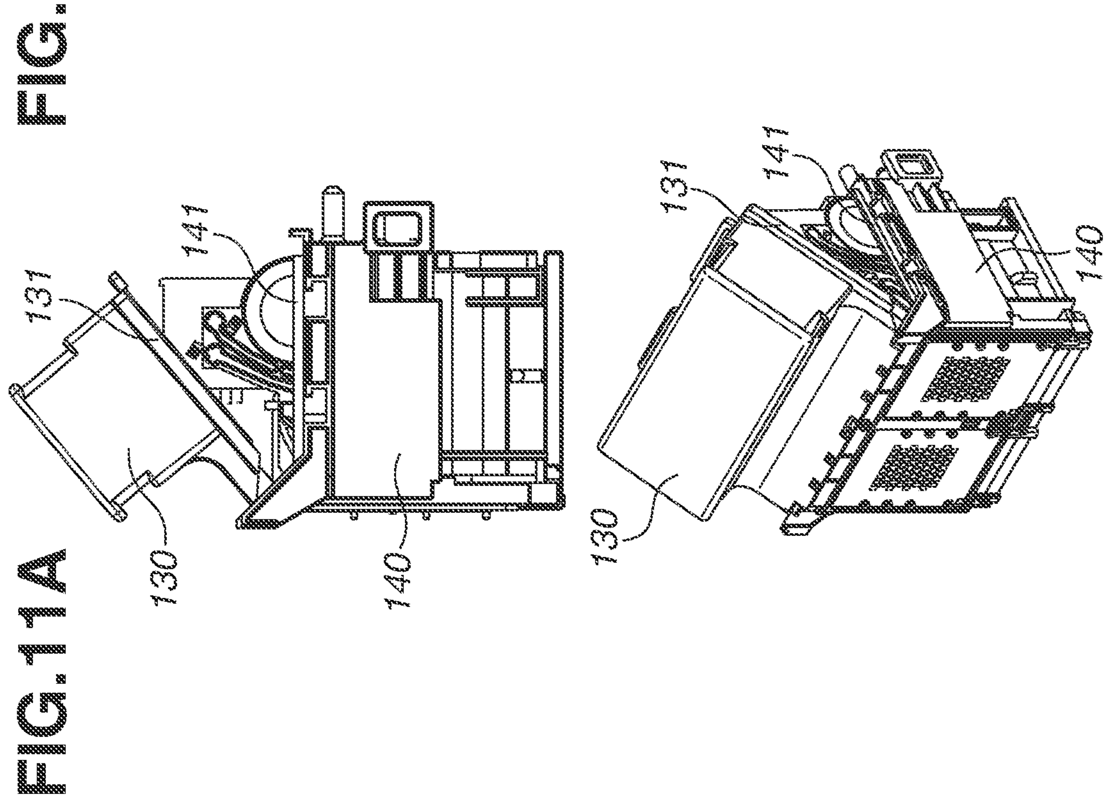

The L-shaped claw does not necessarily have to be provided at the portions between the walls 131 and 141 and the walls 132 and 142. FIGS. 11A to 11C illustrate how the cover 130 is attached to the housing 140. FIGS. 11A to 11C illustrate the wall 131 and the wall 141, and they are rectangular walls without no L-shaped claw provided at these wall portions. Even such a shape will be of no matter as long as the cover 130 can be prevented from being easily detached from the housing 140 by, for example, partially fitting the cover 130 and the housing 140 at the both ends in the B direction.

Next, one application where the present configuration can easily exert its effects will be described. The above-described circulation unit 180 includes two circulation units for each (each color) to generate a differential pressure. Further, the circulation unit 180 is equipped with a small-sized pump for circulating the liquid, a control board for controlling the pump, and the like, and has a larger size in the direction of the gravitational force than a circulation unit provided to a normal discharge head. The circulation unit 180, which is a functional component, should be shielded from contact with the mist 200 and the user, and is required to be covered with the cover 130 or the housing 140. On the other hand, it is not desirable to increase the height of the housing 140 in the direction of the gravitational force when focusing on, for example, the assemblability of the discharge head 100. In light thereof, the cover 130 is suitable to cover an upper portion of the circulation unit 180. However, a space is unavoidably generated between the members of the housing 140 and the cover 130 on a surface perpendicular to the A direction (the side surface). Therefore, in this case, the present configuration can easily exert its effects.

The molding material of the housing 140 is required to satisfy a liquid contact property for forming the flow path, rigidity for fixing the discharge head 100, moldability for accurately positioning the discharge head 100, and the like, and thus the material should be selected from a narrow range of choices. On the other hand, the cover 130 is basically a component that functions as a protection for components in the discharge head 100 and a user holding portion, so that the shape and the material thereof can be relatively freely selected. For example, in a case where a material having a higher specific gravity than the housing 140 is selected for the cover 130, such a selection allows the inertial force to largely work, thereby allowing it to work advantageously for the movement of the cover 130 in the A direction when the carriage 170 (the discharge head 100) switches the direction during the reciprocating motion thereof. In this case, the effect can be further enhanced by, for example, providing a structure that helps the inertial force to work well like thickening the cover 130. Conversely, in a case where a material having a lower specific gravity than the housing 140 is selected for the cover 130, such a selection facilitates a movement of the cover 130 to an opposite side of the head movement direction due to a wind pressure received on the side surface of the head cover. In this case, the effect can be enhanced by a weight reduction with a reduction in the thickness of the cover 130 or a structure leading to, for example, an increase in the pressure reception area.

Figure 12:
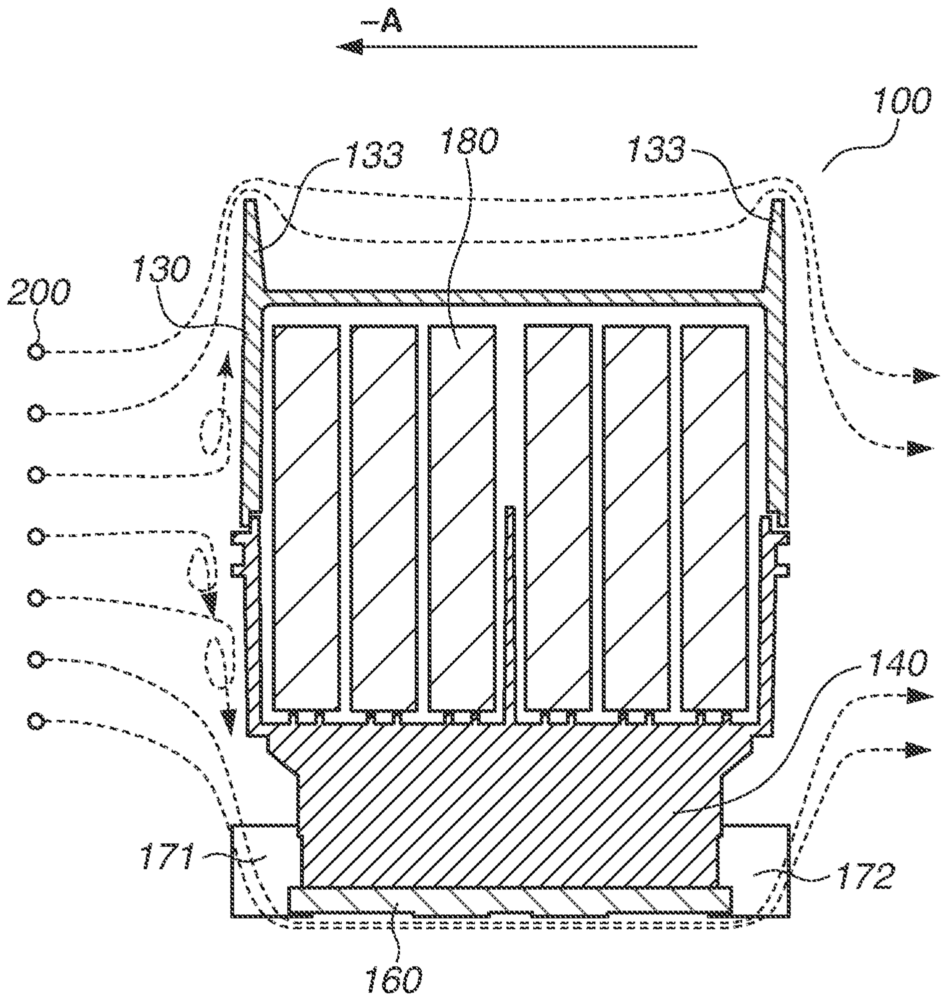
FIG. 12 illustrates a cross section of the discharge head.

FIG. 12 illustrates the discharge head 100 configured partially differently from the above-described configuration. The descriptions of portions in common with the above-described configuration will be omitted here. FIG. 12 illustrates a view of the cross-section of the discharge head 100 when the carriage 170 and the discharge head 100 are moving in the −A direction. Similarly to the above-described configuration, the cover 130 moves to the opposite side of the travelling direction and closes the space between the cover 130 and the housing 140 in the travelling direction side by receiving a wind pressure from the travelling direction (the movement direction) when the discharge head 100 moves. In light thereof, a pressure reception unit 133 is provided to the cover 130 to allow the cover 130 to move with improved responsiveness. The pressure reception unit 133 is a plate-shaped member, and includes a surface protruding from a top surface of the cover 130 upward in the direction of the gravitational force and extending perpendicular to the A direction. The cover 130 is configured to easily receive the wind pressure for moving the cover 130 to the opposite side of the travelling direction of the carriage 170 and the discharge head 100 due to an increase in the pressure reception area with this pressure reception unit 133. This provision facilitates the movement of the cover 130 relative to the housing 140 in the A direction when the carriage 170 scans in the scanning direction. In FIG. 12, the plate-shaped pressure reception unit 133 is provided on each of the both side surfaces of the cover 130 and is also provided integrally with the cover 130. The pressure reception unit 133 can be provided only on a surface of the cover 130 on one side and/or can be provided as a member different from the cover 130.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-081675, filed May 13, 2021, and Japanese Patent Application No. 2022-025538, filed Feb. 22, 2022, which are hereby incorporated by reference herein in their entirety.

What is claimed is:

1. An inkjet recording apparatus comprising:

a carriage configured to scan in a scanning direction; and a discharge head mounted on the carriage and configured to discharge liquid, wherein the discharge head includes a housing and a cover that covers the housing, wherein a space is provided between an end portion of the cover and an end portion of the housing in the scanning direction, and wherein the cover is configured to be movable relative to the housing in the scanning direction.

2. The inkjet recording apparatus according to claim 1, wherein, when the carriage moves in the scanning direction, the space reduces and is closed on a front side in a travelling direction of the carriage and the space increases on a back side in the travelling direction of the carriage.

3. The inkjet recording apparatus according to claim 1, wherein the space has a width of 0.4 millimeters (mm) or wider and 1.0 mm or narrower in the scanning direction when maximumly increasing on a back side in a travelling direction of the carriage.

4. The inkjet recording apparatus according to claim 1, wherein, when the carriage moves in the scanning direction, the cover and the housing are in abutment with each other and the space is closed on a front side in a travelling direction of the carriage.

5. The inkjet recording apparatus according to claim 1, wherein a claw is provided at the end portion of the cover in the scanning direction, a groove corresponding to the claw is provided at the end portion of the housing in the scanning direction, and separation between the cover and the housing in a direction of a gravitational force is prevented or reduced with fitting of the claw in the groove.

6. The inkjet recording apparatus according to claim 1, wherein separation between the cover and the housing in a direction of a gravitational force is prevented or reduced with fitting of a claw to a groove at end portions of the housing and the cover in a conveyance direction in which a recording medium that receives the discharge of the liquid by the discharge head is conveyed.

7. The inkjet recording apparatus according to claim 6, wherein the fitting between the claw and the groove is established at each of both ends of the cover and the housing in the conveyance direction.

8. The inkjet recording apparatus according to claim 1, wherein resin molding material included with the cover has a specific gravity that is greater that a specific gravity of resin molding material included with the housing.

9. The inkjet recording apparatus according to claim 1, wherein a pressure reception unit that is plate-shaped is provided to the cover, is configured to receive a wind pressure from a travelling direction side of the carriage, and protrudes upward in a direction of a gravitational force of the cover.

10. The inkjet recording apparatus according to claim 1, wherein the housing includes an electric contact in a portion covered with the cover.

11. The inkjet recording apparatus according to claim 1, wherein the housing includes a circulation unit in a portion covered with the cover.

12. The inkjet recording apparatus according to claim 11, wherein the circulation unit includes a pressure control member configured to control a pressure in a flow path in the discharge head.

13. An inkjet recording apparatus comprising:

a carriage configured to be movable in a direction substantially perpendicular to a conveyance direction of a recording medium; and a discharge head mounted on the carriage and configured to discharge liquid, wherein the discharge head includes a housing and a cover that covers the housing, and wherein the cover is configured to be attached in such a manner that, when the carriage moves, the cover is movable relative to the housing in an opposite direction of a direction of the movement of the carriage.

14. The inkjet recording apparatus according to claim 13, wherein a space having a width changing according to the movement of the cover is provided between an end portion of the cover and an end portion of the housing in a scanning direction.

15. The inkjet recording apparatus according to claim 14, wherein, when the carriage moves in a movement direction, the space reduces and is closed on a front side in the movement direction of the carriage and the space increases on a back side in the movement direction of the carriage.

16. The inkjet recording apparatus according to claim 15, wherein the space has a width of 0.4 mm or wider and 1.0 mm or narrower in the movement direction when maximumly increasing on the back side in the movement direction of the carriage.

17. An inkjet recording apparatus comprising:

a carriage configured to scan in a scanning direction; and a discharge head mounted on the carriage and configured to discharge liquid, wherein the discharge head includes a housing and a cover that covers the housing, and wherein the cover is configured to be attached movably relative to the housing in the scanning direction when the carriage scans in the scanning direction.

18. The inkjet recording apparatus according to claim 17, wherein a space having a width changing according to the movement of the cover is provided between an end portion of the cover and an end portion of the housing in the scanning direction.

19. The inkjet recording apparatus according to claim 18, wherein, when the carriage moves in the scanning direction, the space reduces and is closed on a front side in a travelling direction of the carriage and the space increases on a back side in the travelling direction of the carriage.

20. The inkjet recording apparatus according to claim 19, wherein the space has a width of 0.4 millimeters (mm) or wider and 1.0 mm or narrower in the scanning direction when maximumly increasing on the back side in the travelling direction of the carriage.

21. The inkjet recording apparatus according to claim 19, wherein, when the carriage moves in the scanning direction, the cover and the housing are in abutment with each other and the space is closed on the front side in the travelling direction of the carriage.

22. An inkjet recording apparatus comprising:

a carriage configured to be moved by the inkjet recording apparatus to scan in a scanning direction; and a discharge head mounted on the carriage and configured to discharge liquid, wherein the discharge head includes a cover and a housing configured to be closed by the cover, wherein a width of the cover and a width of the housing where the cover closes the housing are different from each other in that, when the carriage moves in a first scanning direction, the cover is configured to moves relative to the housing to form a first seal with the housing at a leading side of the moving discharge head, and wherein the first seal reduces intrusion of ink mist into the discharge head at the first seal when the discharge head moves through the ink mist in the first scanning direction.

23. The inkjet recording apparatus according to claim 22, wherein, when the carriage moves in a second scanning direction opposite from the first scanning direction, the cover moves relative to the housing to form a second seal with the housing, different from the first seal, at the leading side of the moving discharge head, and wherein the second seal reduces intrusion of ink mist into the discharge head at the second seal when the discharge head moves through the ink mist in the second scanning direction.

24. The inkjet recording apparatus according to claim 23, wherein, when the carriage moves in the first scanning direction, the cover moves relative to the housing to release the second seal and further form a first gap with the housing at a trailing side of the moving discharge head, wherein, when the carriage moves in the second scanning direction, the cover moves relative to the housing to release the first seal and further form a second gap with the housing at the trailing side of the moving discharge head, and wherein the first gap and the second gap at the trailing side of the moving discharge head are such that they do not increase intrusion of ink mist into the discharge head when the discharge head moves through the ink mist.

* * * * *